May 10, 1938. R. CHILTON 2,116,861
DYNAMIC DAMPER
Filed Jan. 9, 1937
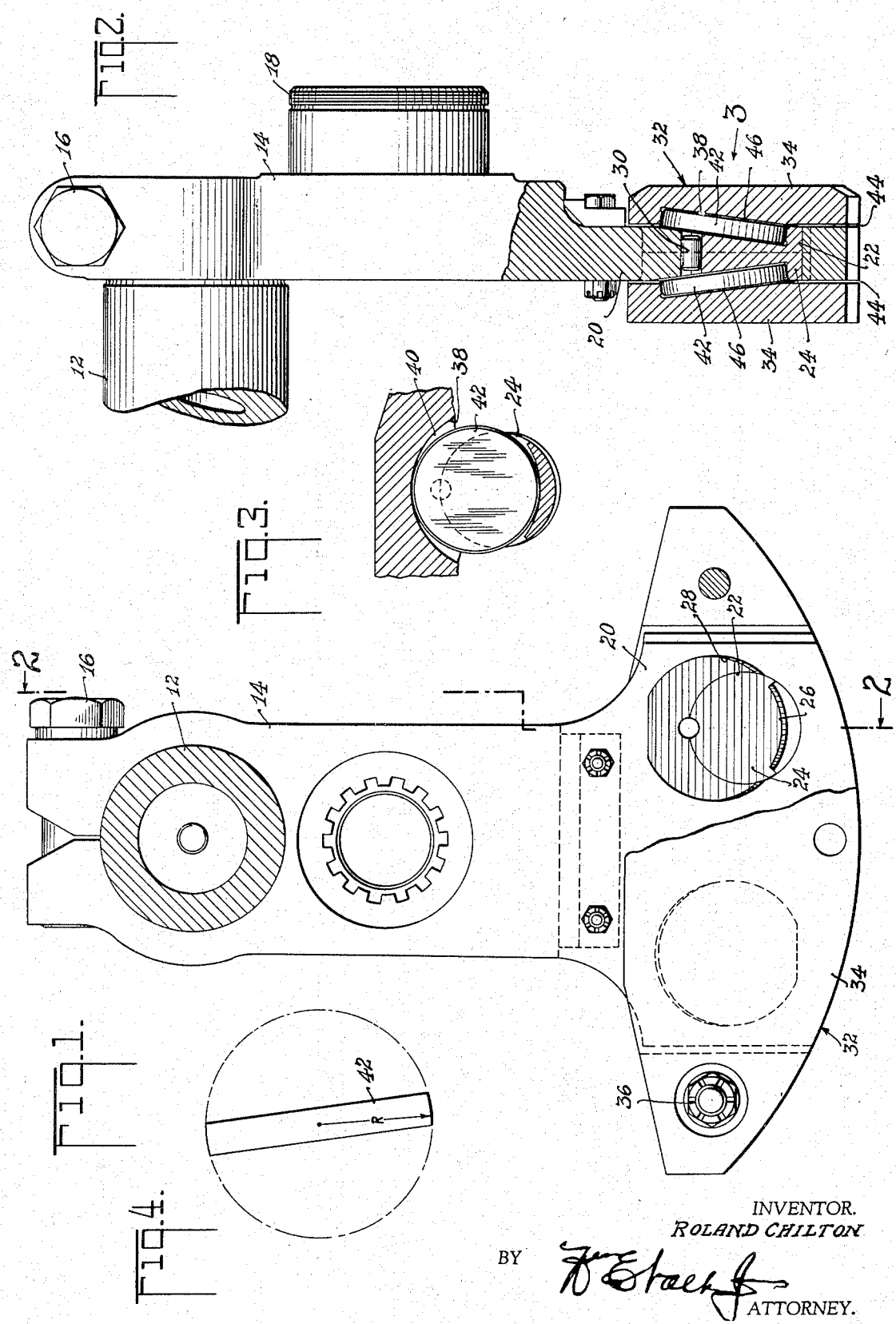
INVENTOR.
ROLAND CHILTON
BY
ATTORNEY.

Patented May 10, 1938

2,116,861

UNITED STATES PATENT OFFICE 2,116,861

DYNAMIC DAMPER

Roland Chilton, Ridgewood, N. J., assignor to The Reed Propeller Co., Inc., a corporation of New York Application January 9, 1937, Serial No. 119,728

7 Claims. (Cl. 74—604)

This invention relates to engines, and is particularly concerned with improvements in dynamic torque equalizers of generally the same type as that disclosed in my co-pending application Serial No. 7475, filed February 21, 1933.

In that application I show a dynamic torque equalizer consisting of a counterweight mounted for pendular movement with respect to an extension on the crankshaft of an engine. The pendulum support comprises spaced rollers freely engaged in holes of more-than-roller diameter formed in both the extension and the counterweight. By this method of suspension, the counterweight is endowed with the properties of a simple pendulum, having a pendulum length equal to the difference in diameter between the rollers and holes, the holes comprising arcuate tracks for supporting the counterweight against centrifugal forces. The torque equalizer of the co-pending application is arranged to swing pendularly in synchronism with exciting torsional impulses, since the system increases in pendulum frequency in direct proportion to increase of rotational speed of the shaft. Thus, a fixed number of counterweight swings per revolution is obtained, and by selection of the appropriate pendulum length, any desired number of swings per shaft revolution may be obtained. Torque equalizers of the type disclosed in the co-pending application have gone into extensive use, and in general have been extremely satisfactory both from the standpoint of their efficiency and of their durability.

However, in some types of engines to which said torque equalizer has been applied, scuffing of the rollers and tracks has been encountered. Since, when operating properly, the rollers and tracks are in pure rolling contact, such scuffing would indicate sliding of the elements with respect to one another, and this scuffing or sliding has been traced to very slight movement or vibration of the counterweight in a direction parallel to the shaft axis. Because of the high contact loads between rollers and tracks, such slight axial movement can cause undue scuffing and wear of the elements of the assembly. The axial movement is believed to be due either to vibration of the counterweights axially of the shaft, or to the possibility that the rotation of the counterweights may not be truly in a plane normal to the shaft axis at all times.

The structure of this invention has for an object the overcoming of scuffing due to either of the above mentioned vibration causes.

A further object is to permit of slight axial movement of the counterweight with respect to the crankshaft while still maintaining rolling contact between the rollers and the counterweight and crankshaft, respectively.

Other objects and advantages of the invention will be apparent from, or will be pointed out in, the following description with reference to the drawing, in which:

Fig. 1 is an axial view of a crankshaft and counterweight embodying the invention, part of the counterweight being removed;

Fig. 2 is an axial view of part of the crankshaft counterweight, partly broken away, on the line 2—2 of Fig. 1;

Fig. 3 is an enlarged fragmentary section through one of the roller suspension units as from the arrow 3 of Fig. 2, and Fig. 4 is a view of one of the rollers illustrating the spherically formed periphery thereof.

The conventional aircraft engine crankshaft comprises a crankpin 12 integral with a power shaft (not shown), but upon the rearward end of which is clamped a cheek 14 by means of a clamp bolt 16. The cheek 14 is provided with a rear journal 18. The cheek 14 extends beyond the journal 18 and is provided with an extension 20, which is opposite to the crankpin 12, having axially spaced bores 22 within which are inserted hardened plugs 24. Each plug 24, on each side thereof, is angularly recessed throughout most of its surface, but its lower portion is left at full plug thickness, equivalent to the thickness of the extension 20, and is profiled to provide an arcuate track 26, the track comprising a segment of a cylinder, the axis of which is tilted relative to the crankshaft axis. The extension 20 is recessed as at 28 for disc clearance. Each plug 24 is retained in fixed relation to the extension 20 by means of a dowel 30 engaging part of the plug and part of the extension.

A counterweight 32 comprises similar halves 34 embracing the extension 20 and bolted together at their ends as at 36. The counterweight halves 34 are each provided with a pair of angular recesses 38 of generally cylindrical form, the top part of each of which is formed as an arcuate track 40 of the same radius as the track 26, each track 40 being the counterpart of corresponding track 26, being, as above mentioned, angulated with respect to the crankshaft axis. Between respective sets of tracks 26 and 40 are placed disc type rollers 42 having a radius somewhat smaller than the radius upon which the tracks 26 and 40 are struck. The difference in radius between the tracks and the rollers is the determinant for the frequency at which the counterweight will vibrate in operation. The periphery of each disc 42 is given a compoundly curved conformation, as shown in Fig. 4, the curvature of disc edge elements normal to the plane of the disc being conveniently struck on the same radius as the disc itself. Thus, when the discs 42 are in assembled relationship, and bearing upon the tracks 26 and 40, each disc may roll upon the track substantially in the plane of rotation of the crankshaft, and also may roll slightly upon the tracks in planes generally parallel to the crankshaft axis. It will be appreciated that clearance spaces 44 must be allowed between the extension 20 and the embracing counterweight 32, and similar clearance spaces 46 are provided between the disc sides and the recesses formed in the counterweight and crankshaft extension.

In operation, the counterweight may oscillate relative to the crankshaft extension, due to the rolling contact of the rollers 42 with the tracks 26 and 40, in the same manner as obtains in the invention of said prior application, Serial No. 7475. When the counterweight or crankshaft extension had any tendency to vibrate in a direction parallel to the axis of the crankshaft, and where relative axial vibration exists between the counterweight and the crankshaft extension, the discs 42 may rock slightly with respect to either the counterweight or extension tracks, due to the fact that the disc edges are of spherical conformation and the track faces are of cylindrical conformation. Thus, no actual sliding contact of the discs relative to the tracks may obtain and as a result, the scuffing tendencies previously mentioned are completely eliminated.

The objective in using a plug such as 24 is that such a plug may be hardened to sustain properly the high loads imposed upon the tracks 26. The extension 20, as a part to be fabricated, is rather large to permit of local hardening of the tracks where the tracks 26 are made integral therewith. On the other hand, the counterweight halves 34 are relatively small in size and may be hardened as units, whereby the tracks 40 are given physical characteristics adequate to sustain the loads, eliminating the necessity of utilizing separately hardened and inserted tracks in lieu of the integral tracks 40. The tracks 26 and 40 need not necessarily be cylindrical, nor need the edges of the discs 42 be spherical. These elements should be proportioned to be relatively convex in an axial plane as well as in the plane of rotation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. The combination with a crankshaft member and a counterweight member having opposed arcuate tracks, of discs having spherical edges engaging said tracks to permit slight rolling action axially of the discs.

2. The combination of a crankshaft member and a counterweight having axially inclined pockets of parti-cylindrical form comprising opposed arcuate tracks, of spherical edged rollers engaging said tracks.

3. The combination of a crankshaft member and a counterweight each having axially inclined pockets of parti-cylindrical form including opposed tracks of parti-cylindrical form, of a disc within each of said pockets and engaging said tracks, the edge of said disc having compound curvature for rolling engagement circumferentially of said tracks and for rolling engagement axially of said tracks.

4. The combination with a crankshaft extension member and a counterweight member, of a pair of oppositely inclined sets of arcuate tracks formed on opposed side faces of said members, and discs having compound curved edges engaging the respective sets of tracks.

5. The combination of a crankshaft extension, a counterweight embracing said extension, said extension and counterweight having opposed arcuate tracks tilted with respect to the plane of rotation, and discs having compound curved edges engaging said tracks to provide for rolling action upon counterweight movement in the plane of rotation, relative to said extension, and to provide for rolling action upon counterweight movement axially of the shaft.

6. The combination, with a crankshaft member and a counterweight member, each having opposed arcuate cylindrically formed tracks therein of finite width, of a roller member having track engaging portions of lesser arcuity than the tracks, said roller track engaging portions being curved in planes within which the roller axis lies for slight rocking of the rollers in a plane generally parallel with the shaft axis.

7. The combination, with a crankshaft member and a counterweight member, each having opposed axially inclined cylindrically curved tracks, said members having more than normal clearance in a direction parallel to the shaft axis, of rollers having spherical track engaging faces for supporting said members upon one another, said rollers being rollable upon respective tracks to permit of circumferential movement and relative movement in a direction parallel to the shaft axis, between said members for the elimination of sliding by virtue of said rolling contacts.

ROLAND CHILTON.